(12) United States Patent
McClung, Jr.

(10) Patent No.: US 7,798,165 B2
(45) Date of Patent: Sep. 21, 2010

(54) RUPTURE CONTROL SYSTEM

(76) Inventor: Oather A McClung, Jr., 6414 Emerald Dr., Rocklin, CA (US) 95677

( * ) Notice: Subject to any disclaimer, the term of this patent is extended or adjusted under 35 U.S.C. 154(b) by 0 days.

(21) Appl. No.: 11/542,876

(22) Filed: Oct. 4, 2006

(65) Prior Publication Data

US 2007/0074759 A1 Apr. 5, 2007

Related U.S. Application Data

(60) Provisional application No. 60/596,585, filed on Oct. 5, 2005.

(51) Int. Cl.
*F16K 17/40* (2006.01)
*F16L 55/16* (2006.01)
*F16L 9/18* (2006.01)

(52) U.S. Cl. .................. 137/71; 137/312; 138/104; 138/114

(58) Field of Classification Search .............. 137/68.14, 137/312, 71, 75; 285/13, 123.1; 138/104, 138/11, 103, 114
See application file for complete search history.

(56) References Cited

U.S. PATENT DOCUMENTS

| | | | |
|---|---|---|---|
| 1,737,161 A | 11/1929 | Jupp | |
| 2,413,087 A | * 12/1946 | Urbany | 169/61 |
| 2,608,205 A | 8/1952 | Proctor | |
| 2,635,629 A | 4/1953 | Asaro | |
| 2,658,527 A | 11/1953 | Kaiser | |
| 2,798,503 A | 7/1957 | Aubrey et al. | |
| 2,838,074 A | 6/1958 | Lauck | |
| 2,917,077 A | 12/1959 | Ziege | |
| 2,956,586 A | 10/1960 | Zeigler et al. | |
| 3,417,782 A | 12/1968 | Mentnech | |
| 3,512,556 A | 5/1970 | McKhann | |
| 3,561,471 A | 2/1971 | Sands | |
| 3,735,777 A | 5/1973 | Katzer et al. | |
| 3,841,671 A | 10/1974 | Walker | |
| 3,850,199 A | 11/1974 | Stone et al. | |
| 3,907,336 A | 9/1975 | Siegmund | |
| 3,980,112 A | 9/1976 | Basham | |
| 3,986,732 A | 10/1976 | Stanley | |
| 4,149,568 A | 4/1979 | Kuntz et al. | |
| 4,445,332 A | 5/1984 | Thies et al. | |
| 4,673,926 A | 6/1987 | Gorman | |
| 4,847,599 A | 7/1989 | Imiolex et al. | |
| 5,022,685 A | 6/1991 | Stiskin et al. | |
| 5,156,190 A | 10/1992 | Staley, Jr. | |
| 5,285,744 A | 2/1994 | Grantham et al. | |
| 5,640,990 A | * 6/1997 | Rodriguez | 137/68.14 |
| 5,713,387 A | * 2/1998 | Armenia et al. | 137/312 |

(Continued)

*Primary Examiner*—John Rivell
*Assistant Examiner*—Atif H Chaudry

(57) ABSTRACT

In various embodiments, the present invention includes a rupture control system comprising an inner hose, an outer hose, and a valve that is actuated by fluid leaking from the inner hose. The inner hose and the outer hose define a containment passageway therebetween, and the valve includes an inlet, an outlet, a passageway extending between the inlet and the outlet, a valve member readily movable between a first position and a second position, and a valve control chamber. In these embodiments, a rupture in the inner hose places the inner hose in fluid communication with the containment passageway and the valve control chamber, and fluid flowing into the valve control chamber moves the valve member from its first position into its second position, the valve member at least partially blocking the valve passageway in the second position.

16 Claims, 12 Drawing Sheets

U.S. PATENT DOCUMENTS

| | | |
|---|---|---|
| 5,771,916 A | 6/1998 | Armenia et al. |
| 5,865,216 A | 2/1999 | Youngs |
| 5,969,618 A | 10/1999 | Redmond |
| 6,021,808 A * | 2/2000 | Dulac .......................... 137/487 |
| RE37,114 E | 3/2001 | Youngs et al. |
| 6,305,407 B1 * | 10/2001 | Selby .......................... 137/312 |
| 6,446,671 B2 | 9/2002 | Armenia et al. |
| 6,546,951 B1 | 4/2003 | Armenia et al. |
| 6,644,345 B2 | 11/2003 | Dulin |
| 6,792,967 B1 | 9/2004 | Franklin |
| 7,000,644 B2 | 2/2006 | Ichimura et al. |
| 7,004,510 B2 | 2/2006 | Treichel |
| 7,111,638 B2 | 9/2006 | Johnson |

* cited by examiner

RUPTURE CONTROL SYSTEM

PRIORITY

This application claims the benefit under 35 U.S.C. §119 (e) of U.S. Provisional Patent Application Ser. No. 60/596, 585, entitled RUPTURE CONTROL SYSTEMS—VARIABLE MULTIPLICITIES OF METHODS, APPARATUS AND ASSEMBLIES FOR EFFECTING RUPTURE/FAILURE CONTROL OF SINGULAR AND PLURAL HOSE, LINE, CONDUIT, VESSEL AND COMPONENT ENTITIES, BY MEANS OF CONDITION-ACTUATING, FLUID, GAS, SUBSTANCE, VAPOR AND VACUUM CONTAINMENT AND/OR CONTROL, ADDITIONALLY CONSIDERING OPTIONAL COMPONENTS, CONFIGURATIONS, ANNUNCIATIONS, INDICATIONS, ACTUATIONS, INCLUSIONS, ACCOMMODATIONS, AND ARRANGEMENTS, filed on Oct. 5, 2005, the entire disclosure of which is hereby expressly incorporated by reference herein.

FIELD OF THE INVENTION

The present invention generally relates to rupture control systems for controlling fluids, gasses, vapors and/or other substances escaping from ruptures and/or leaks in hoses, lines, conduits, and other vessels. The present invention may be particularly useful in minimizing damage resulting from ruptures and/or leaks in the delivery of water to clothes and dish washing machines, faucets, ice makers, and commodes in residential, commercial, industrial, and other locations. The present invention may be equally useful in minimizing damage resulting from ruptures and/or leaks in the delivery of fuel and/or hydraulic fluids in aircraft, boats, and land vehicles.

BACKGROUND

In the past, various systems and devices have been employed to contain fluids escaping from ruptures in fluid hoses. Fluid hoses, which are typically composed of rubber, tend to wear and break down with time. This deterioration is exacerbated by bending of the hose and the repeated flow of fluid through the hose. Hot water hoses, which are commonly used with household appliances, are particularly susceptible to wear because of the stresses caused by repeated changes in the temperature thereof. As the hose deteriorates, the likelihood of a rupture increases. In the event that the hose ruptures, leaks, or bursts, significant flooding and serious water damage can result. Similarly, ruptures in hydraulic hoses can result in oil burns, fire burns and other injuries associated with the sudden release of hot fluid. Moreover, if the rupture occurs in a hydraulic hose utilized in a boat, or other watercraft, the rupture can result in a major water pollution event. In addition, the rupture of a hydraulic hose or conduit in an aircraft flight control system can have devastating effects due to the loss of control of the aircraft.

In the past, double-wall hoses have been used to contain leaking fluids. Double-wall hoses include an inner hose which is surrounded by an outer hose where, in the event that the inner hose ruptures, the outer hose contains the leaking fluid. Often, the outer hose is connected to a drain and the leaking fluid is directed away from the rupture. However, drains are not always located nearby and, as a result, these devices have limitations. In one application, outer sleeves are placed on the hot and cold water hoses of a clothes washing machine and a drainage hose is interconnected between the outer sleeves to conduct water from a leaking inner hose to a standard drain line. Assembling the outer hoses to the inner hoses is complicated, time-consuming, and often impractical. Furthermore, these systems merely control the fluid flowing from the rupture; however, they do not provide any means for stopping the flow of fluid through the inner hose after it has ruptured.

In the past, electronic sensors have been positioned in the outer hose of double-wall hoses to detect fluid leaking from the inner hose. These sensors are placed in communication with a CPU, or microprocessor, which shuts off the supply of fluid to the inner hose by closing a valve upstream from the rupture. These devices are invariably expensive and are typically difficult for most homeowners to install. Further, not only does the electronic circuitry add cost and reduce the reliability of the system, it also requires the presence of electrical power to function. If a water leak occurs coincidentally with an electrical power outage, the valve may fail to accomplish its purpose unless auxiliary power is supplied.

Other types of systems are known in the art. For example, a soluble-link valve has been used to stop the flow of fluid through a hose. The soluble-link valve includes a valve member, a spring which acts to place the valve member in a closed position, and a fluid-soluble link which holds the valve member in an open position. In use, escaped fluid dissolves the fluid-soluble link holding the valve member in the open position and, thereafter, the spring moves the valve member from the open position into the closed position. However, while the soluble-link is dissolving, fluid may continue to flow through the rupture and damage the surrounding structure and/or environment.

Recent devices include a flood control hose assembly that responds to catastrophic hose ruptures. These devices include a moveable valve member, a valve seat, and a spring positioned within the hose which biases the valve member into an open position. In use, fluid flowing through the hose applies a force to the valve member. Under typical operating conditions, this force is sufficient to compress the spring, but it is not sufficient to seat the valve member against the valve seat. When a rupture occurs in the hose, the pressure differential across the valve may increase and the fluid flowing through the valve may flow faster. As a result, the force applied to the valve member may increase and seat the valve member against the valve seat. However, this type of valve is typically unable to respond to minor leaks or ruptures in the hose. More particularly, minor leaks from the hose may not cause sufficient fluctuations in the fluid flow to actuate the valve. As a result, this type of valve can usually only respond to excessively large changes in fluid flow such as those witnessed during a catastrophic rupture. Clearly, these devices have limitations and an improvement is needed over the foregoing.

SUMMARY

In various embodiments, the present invention includes a rupture control system comprising an inner hose, an outer hose, and a valve that is actuated by fluid leaking from the inner hose. In at least one embodiment, the inner hose and the outer hose define a containment passageway therebetween, and the valve includes an inlet, an outlet, a passageway extending between the inlet and the outlet, a valve member readily movable between a first position and a second position, and a valve control chamber. In these embodiments, a rupture in the inner hose places the inner hose in fluid communication with the containment passageway and the valve control chamber, and fluid flowing into the valve control chamber directly moves the valve member from its first position into its second position, the valve member at least partially blocking the valve passageway in the second position. In at least one embodiment, the valve member entirely stops the flow of fluid through the inner hose when it is moved into its second position.

In various embodiments, the rupture control system further includes a device which indicates the position of the valve member, e.g., whether the valve member is in either its first or second position. This device can also be designed to alert an operator or serviceman that the valve has been actuated and that a rupture may have occurred. The rupture control system can further include devices or systems which reduce the possibility of a false actuation of the valve. More particularly, air within the containment passageway and the valve control chamber, for example, may expand under normal operating conditions. This expansion may cause the valve member to move from its first position to its second position even though the inner hose has not ruptured. These devices can be configured to release this expanded air from the containment passageway and/or valve control chamber into the atmosphere or into the flow of fluid through the inner hose.

BRIEF DESCRIPTION OF THE DRAWINGS

Various embodiments of the present invention are described herein by way of example in conjunction with the following figures, wherein.

Figure 1:
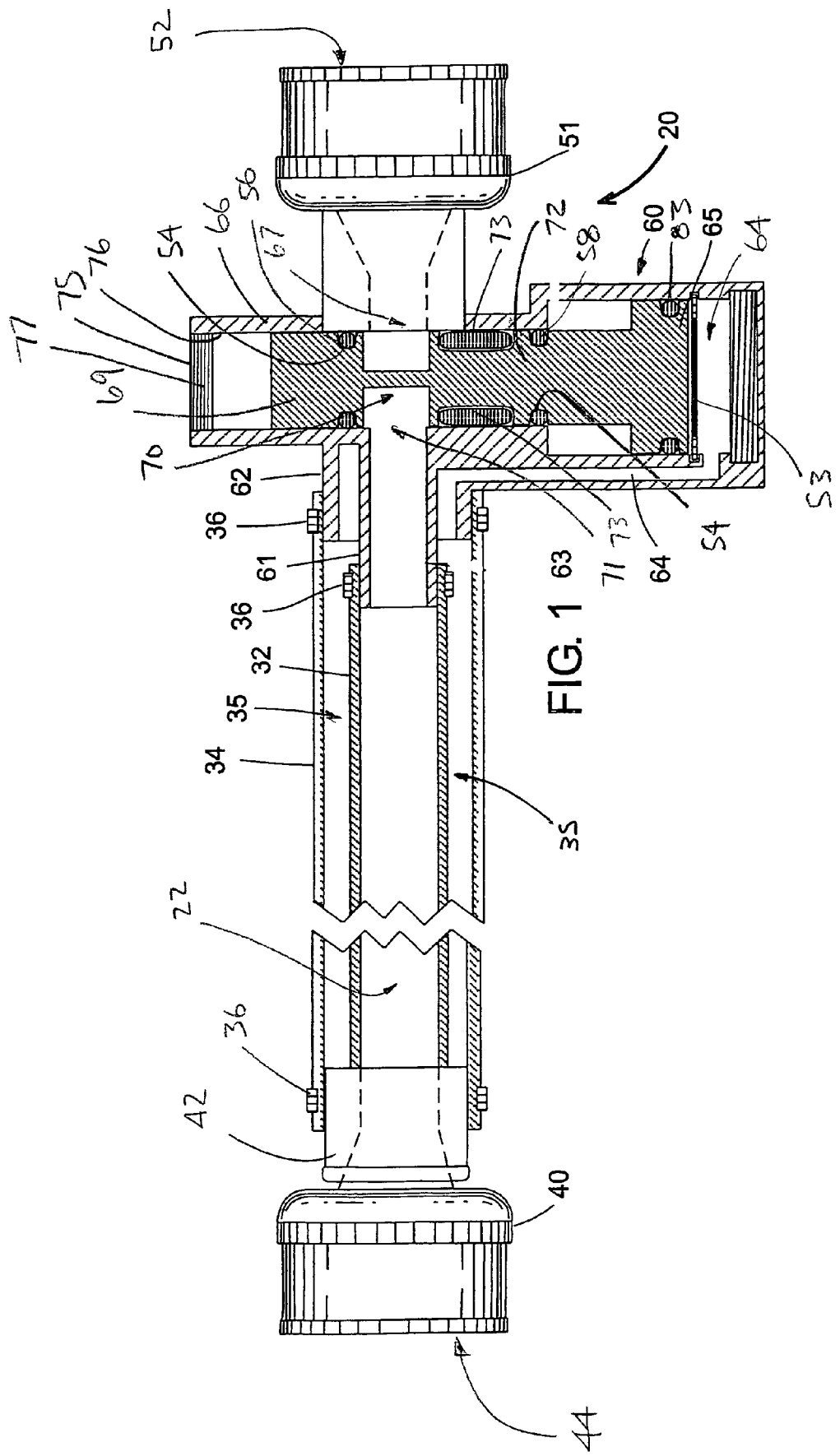
FIG. 1 is a cross-sectional, side view of a rupture control system in accordance with an embodiment of the present invention having an inner hose, an outer hose, and a valve illustrated in an open position.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

For convenience to the reader, the term "fluid" is used interchangeably herein with the terms "substance", "liquid", "gas", and/or "vapor", and is applicable in both the singular and plural senses. The term "hose" is used interchangeably herein with the terms "conveyance line", "conduit" and/or "vessel", and is applicable in both the singular and plural senses. The terms "hydraulic" and "pneumatic" are used interchangeably herein and generally refer to a fluid-actuated system.

Referring now to the drawings, a rupture control system according to an embodiment of the present invention is shown in FIG. 1. Rupture control system 20 includes inner hose 32 and outer hose 34. The inside diameter of outer hose 34 is slightly greater than the outside diameter of inner hose 32. The difference between these diameters defines containment/control passageway 35 therebetween which extends along the length of hoses 32 and 34. Inner hose 32 and outer hose 34 may be constructed of any suitable hose material as would be fitting for a particular application.

Referring to FIG. 1, rupture control system 20 further includes valve 60 and fitting 40. Valve 60, as described in further detail below, is configured to block fluid from flowing into inner hose 32 when inner hose 32 has ruptured. Valve 60 may include inner nipple 61 which may be configured to be received in an end of inner hose 32. To seal inner hose 32 to nipple 61, clamp 36 may be fitted over inner hose 32 and may be tightened until inner hose 32 is compressed between clamp 36 and nipple 61. Valve 60 may further include an outer nipple 62 configured to be received in an end of outer hose 34. Similar to the above, a clamp 36 may be used to seal outer hose 34 to outer nipple 62. Similarly, fitting 40 may include an inner connector (not shown) configured to be received in the opposite end of inner hose 32 and outer connector 42 which may be configured to be received in the opposite end of outer hose 34. As a result of the above, fluid flowing through inner hose 32 preferably does not flow into outer hose 34 under ordinary operating conditions.

Referring to FIG. 1, fitting 40, in the present embodiment, may include device connector 44 which is configured to mate with, and seal to, a connector on a consumer appliance, such as a washing machine, for example. Valve 60 may further include end fitting 51 which is mounted to, or is integral with, valve housing 66. Similar to fitting 40, end fitting 51 may include connector 52 which is configured to mate to a supply-source connector, such as a common household hose fitting, for example. In use, once fittings 40 and 51 are connected to their respective appliance and source connectors, for example, fluid entering valve 60 through fitting 51 preferably flows through valve inlet 67, valve passageway 70, and outlet 71 into the interior 22 of inner hose 32 when valve member 72 of valve 60 is in the position illustrated in FIG. 1.

In the event that inner hose 32 ruptures, or otherwise leaks, the fluid flowing through inner hose 32 will flow into containment passageway 35. Passageway 35 is in fluid communication with valve control chamber 64 such that the fluid flowing into passageway 35 will flow into chamber 64. Once the fluid has entered chamber 64, the fluid can directly force valve member 72 from the position illustrated in FIG. 1, i.e., its open position, to the position illustrated in FIG. 2, i.e., its closed position. Valve member 72, preferably, is readily movable between its open and closed positions and, as a result, valve member 72 can move as soon as the fluid force is applied to it. In effect, valve member 72 can be moved between its open and closed positions without delay. Accordingly, rupture control system 20 can quickly respond to leaks in inner hose 32 and stop the flow of fluid through inner hose 32 before a significant amount of fluid has spilled from the rupture therein. In the present embodiment, valve member 72 is readily movable as it is unaffixed to valve housing 66. Although not illustrated, the rupture control systems disclosed herein could be used in co-operation with other mechanical devices, such as springs, dampers, etc., which facilitate in controlling the movement of valve member 72.

Figure 2:
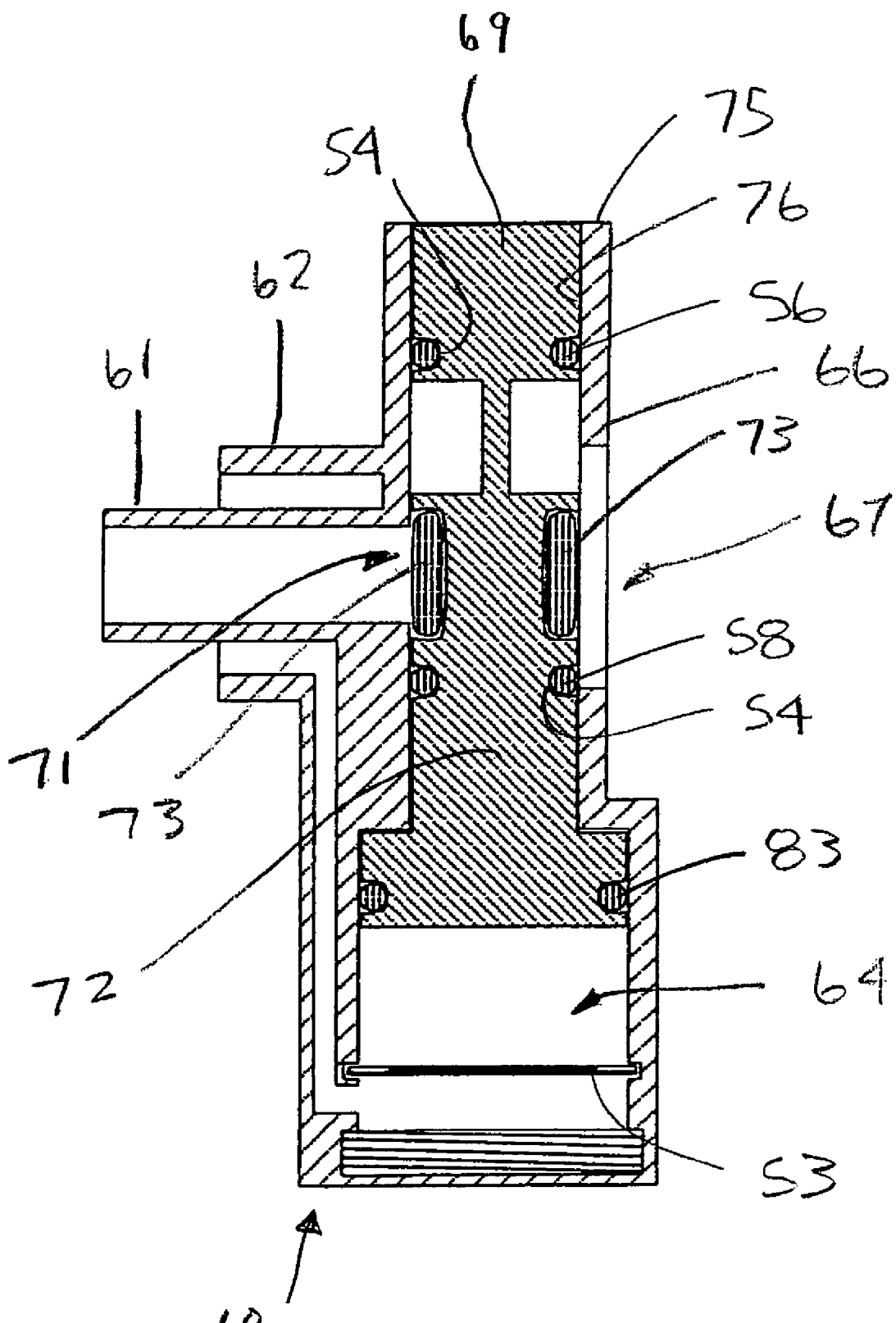
FIG. 2 is a partial cross-sectional view of the valve of the rupture control system of FIG. 1 illustrated in a closed position.

Referring to FIG. 2, valve member 72, when it is moved into this second position, may obstruct the flow of fluid into inner hose 32. As a result, fluid will stop flowing into inner hose 32 and will no longer leak from the rupture in inner hose 32. That is, the flow of fluid may be substantially stopped by valve member 72 to the extent that seal 73, which is compressed between valve member 72 and valve housing 66, can stop the flow of fluid thereby. In various embodiments, a fluid-tight seal can be obtained; however, embodiments are envisioned in which the flow of fluid into inner hose 32 is merely impeded. Valve 60 may further include seals 56 and 58 which are seated within recesses 54 in valve member 72. Seals 56 and 58 may sealingly engage the interior wall of valve housing 66 and prevent fluid flowing through valve passageway 70 from inadvertently flowing into valve control chamber 64, for example.

In effect, the above-described rupture control system 20 utilizes the fluid leaking from the rupture in inner hose 32 to directly activate valve 60 and stop the flow of fluid through inner hose 32. As a result, no additional sensors, CPUs, and/or additional power sources are required to actuate valve 60. Furthermore, larger leaks or ruptures may quickly fill valve control chamber 64 and thereby actuate valve 60 quickly as well. In effect, the responsiveness of valve 60 may be proportional to the rate in which fluid is leaking from inner hose 32. As a result, the rupture control system 20 described herein may provide convenience and peace of mind for the user, as it automatically responds to leaks and ruptures. Furthermore, containment passageway 35 of the present embodiment may contain the fluid that has leaked from inner hose 32 with no loss therefrom or corresponding spill damage.

Figure 3:
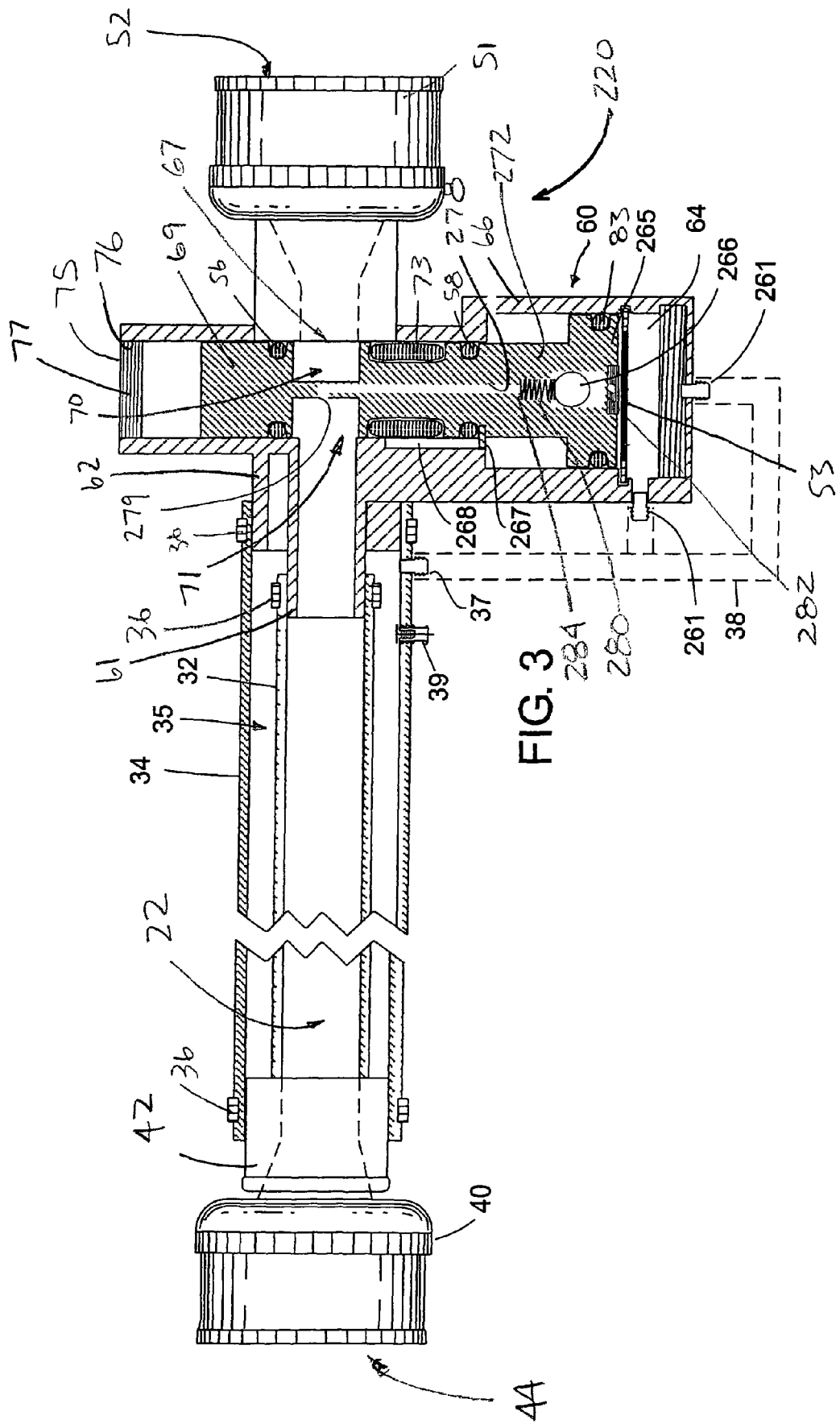
FIG. 3 is a cross-sectional, side view of a rupture control system in accordance with an alternative embodiment of the present invention having external valve activation fluid routes and an air pressure relief system.

Referring to FIG. 3, rupture control system 220, an alternative embodiment of the present invention, is constructed so that outer hose 34 includes port 37. Port 37 allows the fluid flowing into passageway 35 to flow into control chamber 64 via external conduit 38. Having an external conduit, as opposed to an internal passage as illustrated in FIG. 1, may simplify the manufacturing of valve 60. Port 37 may comprise an annular or cylindrical section of pipe, hose, or tubing that is fastened to and extends transversely from hose 34. Port 37 may be connected to hose 34 in any suitable manner and at any suitable point along the length of hose 34 and containment passageway 35. In the illustrated embodiment, conduit 38 is connected to port 37 by pushing conduit 38 onto a distal lip of port 37 to fluidly connect port 37 with ports 261 in valve housing 66. Similar to port 37, ports 261 are connected to valve housing 66 in any suitable manner, such as by threading, press-fitting, and/or welding, for example, and at any suitable location in valve housing 66.

Figure 5:
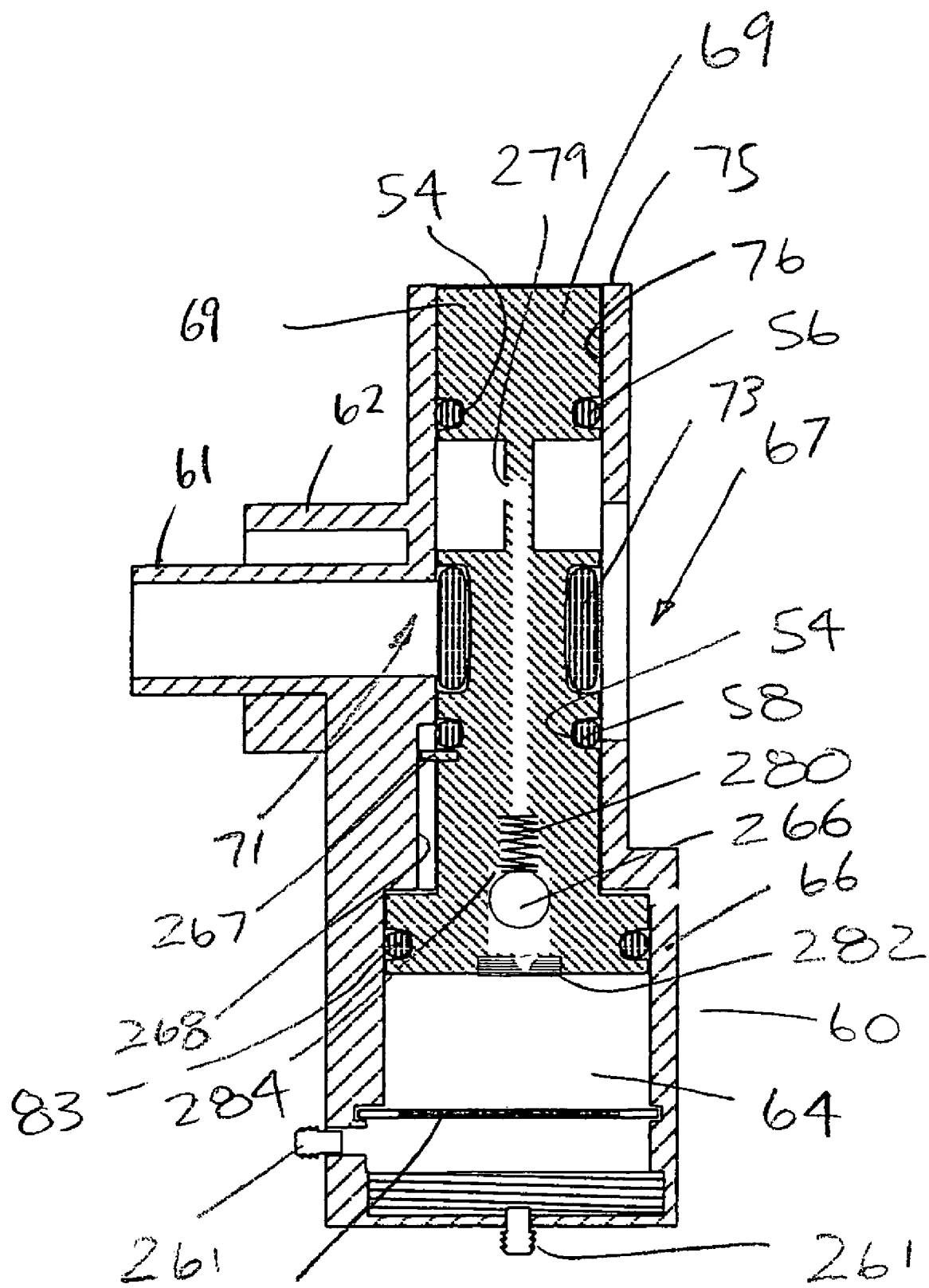
FIG. 5 is a partial cross-sectional view of the valve of the rupture control system of FIG. 3 illustrated in a closed position.

Referring to FIGS. 3 and 5, when valve member 72 is moved from its open position in FIG. 3 to its closed position in FIG. 5, piston indicator 69 is moved so that it is substantially flush with upper portion 75 of valve housing 66. As a result, a consumer, and/or a repairman, can evaluate when valve 60 has been actuated by looking through aperture 76 in upper portion 75 to examine whether indicator 69 is flush with upper portion 75. In the illustrated embodiment, aperture 75 is large enough for the consumer and/or repairman to insert their finger or a tool, for example, into aperture 76 to push valve member 72 back into its open position. To facilitate the re-positioning of valve member 72, valve 60 may further include valve stop 53 which provides a positive stop against which valve member 72 can be supported.

Figure 8:
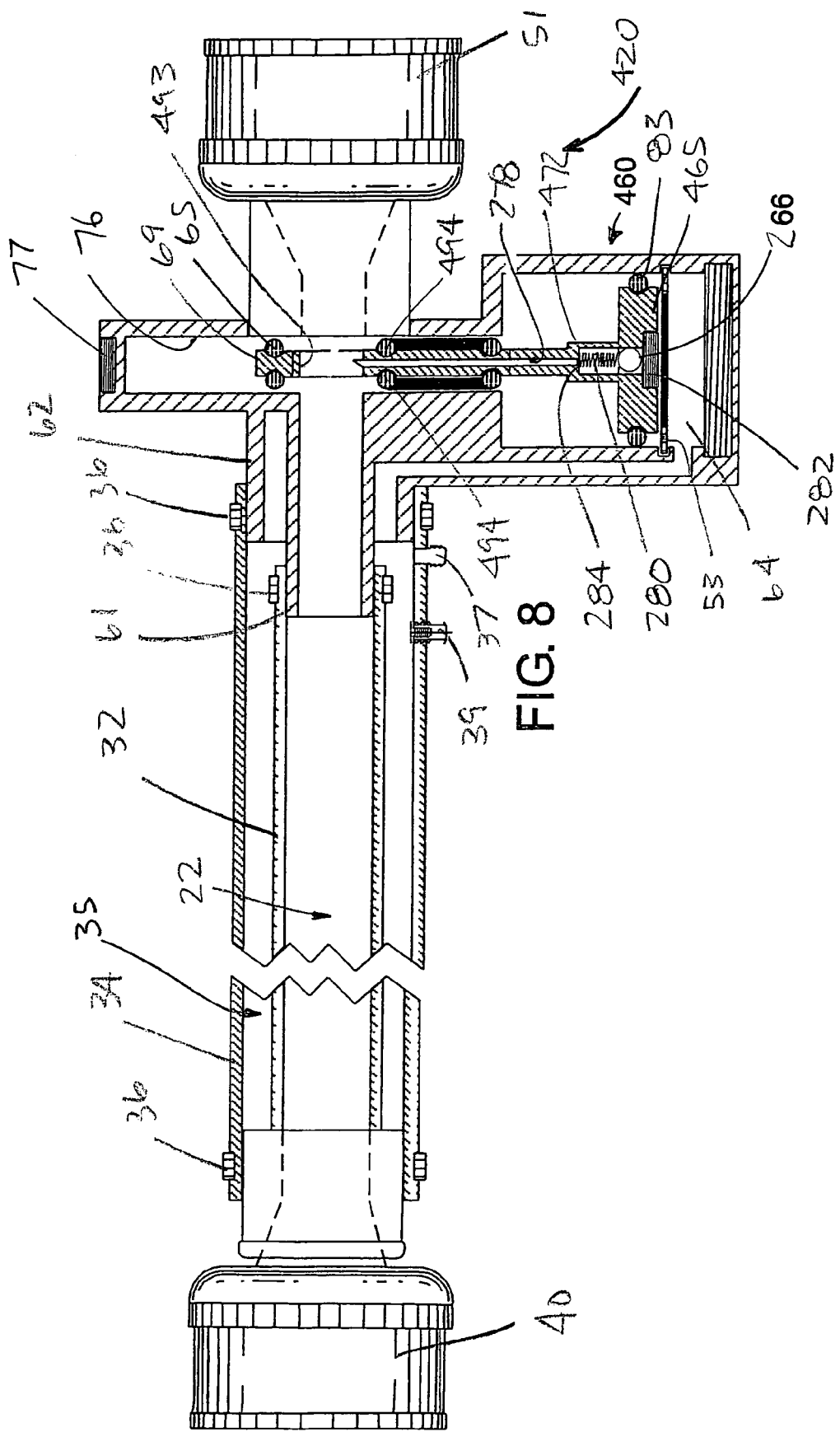
FIG. 8 is a cross-sectional, side view of a rupture control system in accordance with an alternative embodiment of the present invention having an inner hose, an outer hose, and a gate valve illustrated in an open position.

After resetting the valve member, if a rupture in inner hose 32 is still present, the fluid leaking from the rupture may re-actuate valve 60 and move valve member 72 back into its closed position. This feature may assist the consumer, and/or repairman, in diagnosing the problem. In other embodiments, it may be desirable to prevent the consumer from accessing valve member 72 and resetting valve 60. Referring to FIG. 8, the valve housing of rupture control system 420, an alternative embodiment of the present invention, does not include an accessible aperture 76. To further assist the repairman or consumer in diagnosing a rupture or leak, in various embodiments, outer hose 34 can be constructed from a clear or translucent material, for example, that allows the repairman or consumer to see fluid within containment passageway 35. In applications in which the fluid is clear, for example, a dye, or colorant, can be mixed into the fluid to make the fluid readily visible when it is leaking into passageway 35.

Optionally, in various embodiments, a "stand-down" control valve (not illustrated) can be placed in containment passageway 35 that can be operated to block the flow of fluid into control chamber 64. In these embodiments, it may be desirable to "defeat" the actuation of valve 60 so that the flow of fluid within the system is permitted eventhough it is leaking. For example, in the event of a leak in a motorboat hydraulic system utilizing rupture control system 20, the user may operate the stand-down control valve to allow the hydraulic system to continue to operate after failure in order to get back to shore. In these embodiments, containment passageway 35 can be configured to retain the fluid leaking from inner passage 22 until such time that the rupture control system can be replaced. In other various embodiments, the stand-down control valve can be actuated to physically block valve member 72 from moving from its open position to its closed position. The above-described control valves can be actuated, in various embodiments, by fluid-operated, mechanical, and/or electro-mechanical systems.

In other various embodiments, indicator 69 may be operatively engaged with various external devices and systems that respond to movements of indicator 69. Referring to FIG. 3, valve housing 66 may include threads 77 which may allow these devices to be quickly and easily attached to valve 60, for example. These devices can be mechanically activated by a switch, for example, that is triggered by indicator 69 and/or electro-mechanically activated by a sensor, for example. In various embodiments, the device can include a siren, alarm, and/or light which announce that valve 60 has been actuated. In various embodiments, indicator 69 can be directly engaged with a parallel system that can be activated to act in the place of the leaking system. The above-described devices can also be placed in communication with a CPU, or microprocessor, which can re-direct the flow of fluid through an alternate and/or parallel path or, in other embodiments, activate an entirely separate hydraulic system, for example. These embodiments may be particularly useful in aircraft, or other vehicles, to reroute the flow of essential fluids and/or fuels without jeopardizing the control and function of the craft.

Figure 6:
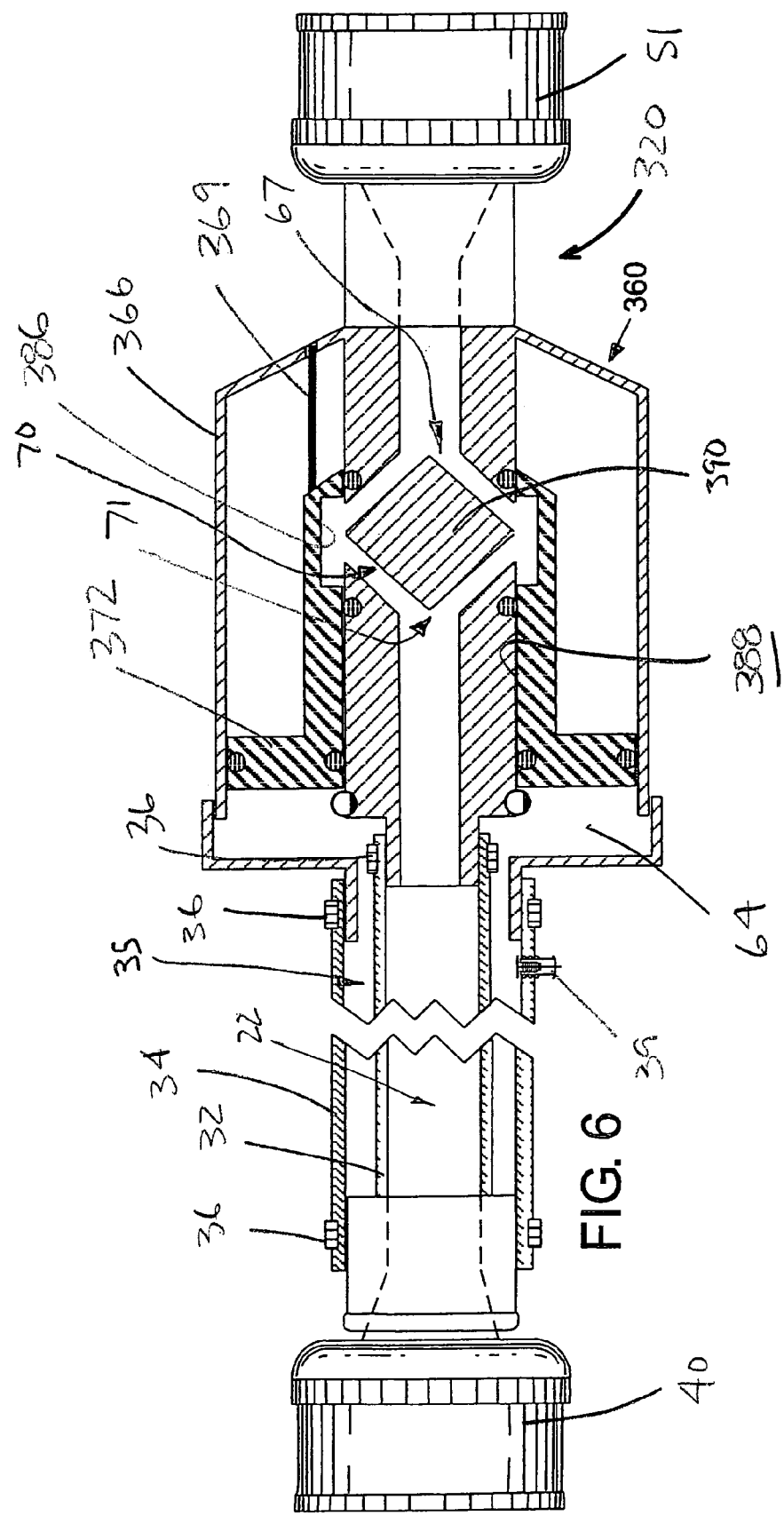
FIG. 6 is a cross-sectional, side view of a rupture control system in accordance with an alternative embodiment of the present invention having an inner hose, an outer hose, and a valve illustrated in an open position.
Figure 7:
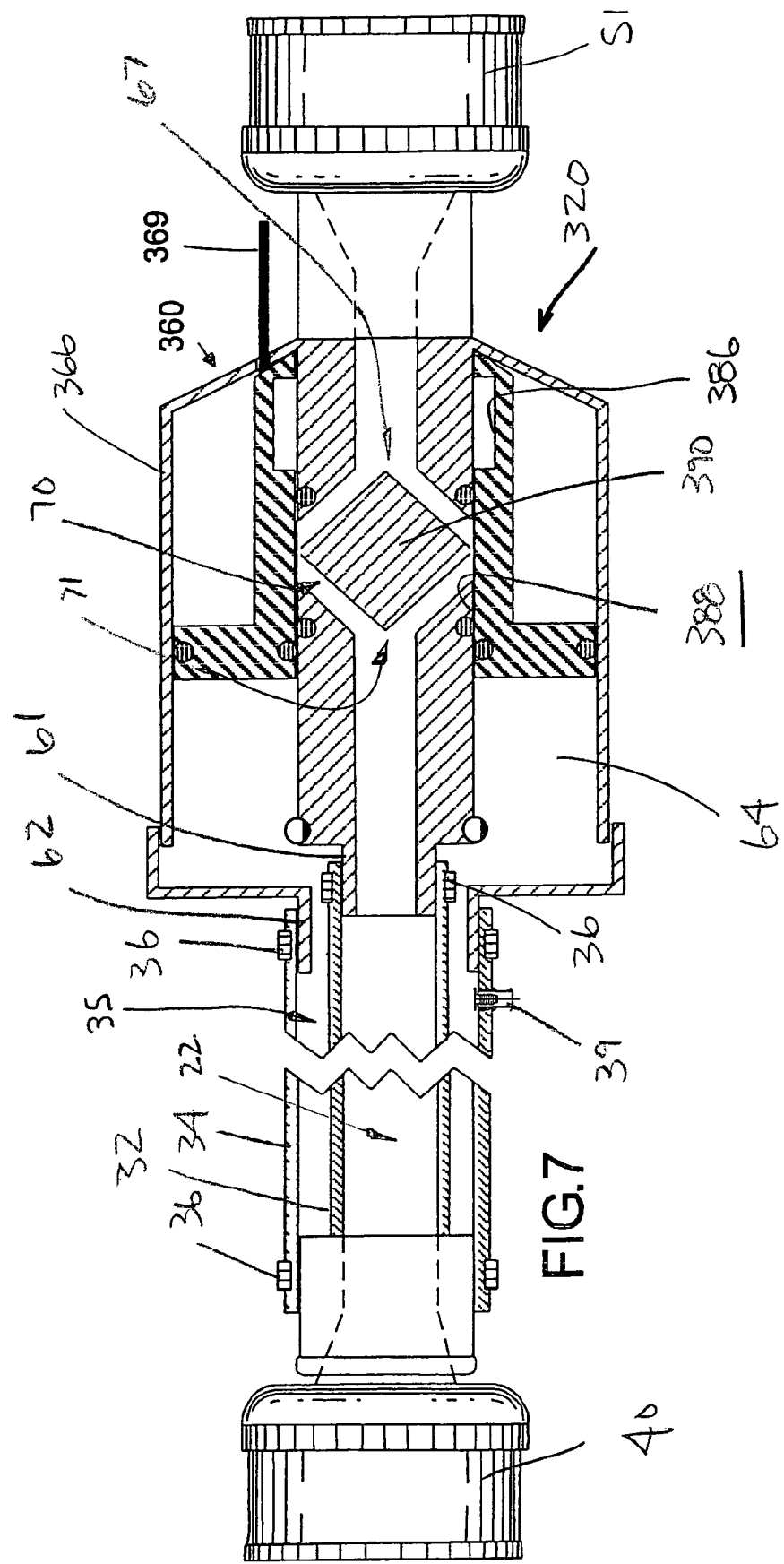
FIG. 7 is a cross-sectional, side view of the rupture control system of FIG. 6 illustrated in a closed position.

Referring to FIGS. 6 and 7, rupture control system 320 may include an alternative valve construction in accordance with an embodiment of the present invention. Similar to rupture control system 20, which is illustrated in FIG. 1, rupture control system 320 includes inner hose 32 and outer hose 34 which are clamped to valve 360. Also similar to rupture control system 320, valve 360 includes a valve member, i.e., valve member 372, which is moved between open and closed positions to block the flow of fluid into inner hose 32, as described above. Valve member 372 includes annular recess 386 which, when valve member 372 is in its open position, is in fluid communication with valve inlet 67 and valve outlet 71 to permit fluid to flow therethrough. When valve member 72 is moved into is closed position, as illustrated in FIG. 7, annular recess 386 is no longer in fluid communication with inlet 67 and outlet 71. Rather, sealing surface 388 of valve member 372 is positioned against stop 390 to block the flow of fluid through passageway 70.

Referring to FIG. 3, under ordinary operating conditions, containment passageway 35 and valve control chamber 64 may define a sealed volume. Owing to temperature and pressure fluctuations of ambient conditions and/or fluctuations in the properties of the fluid flowing though rupture control assembly 20, air within the sealed volume may expand. As a result, the expanded air may move valve member 72 from its open position such that it blocks the flow of fluid through valve passageway 70 even though there is not a rupture in inner hose 32. To prevent the false actuation of valve 60, referring to FIG. 3, a relief valve may be placed in fluid communication with containment passageway 35 and/or valve control chamber 64.

Figure 4:
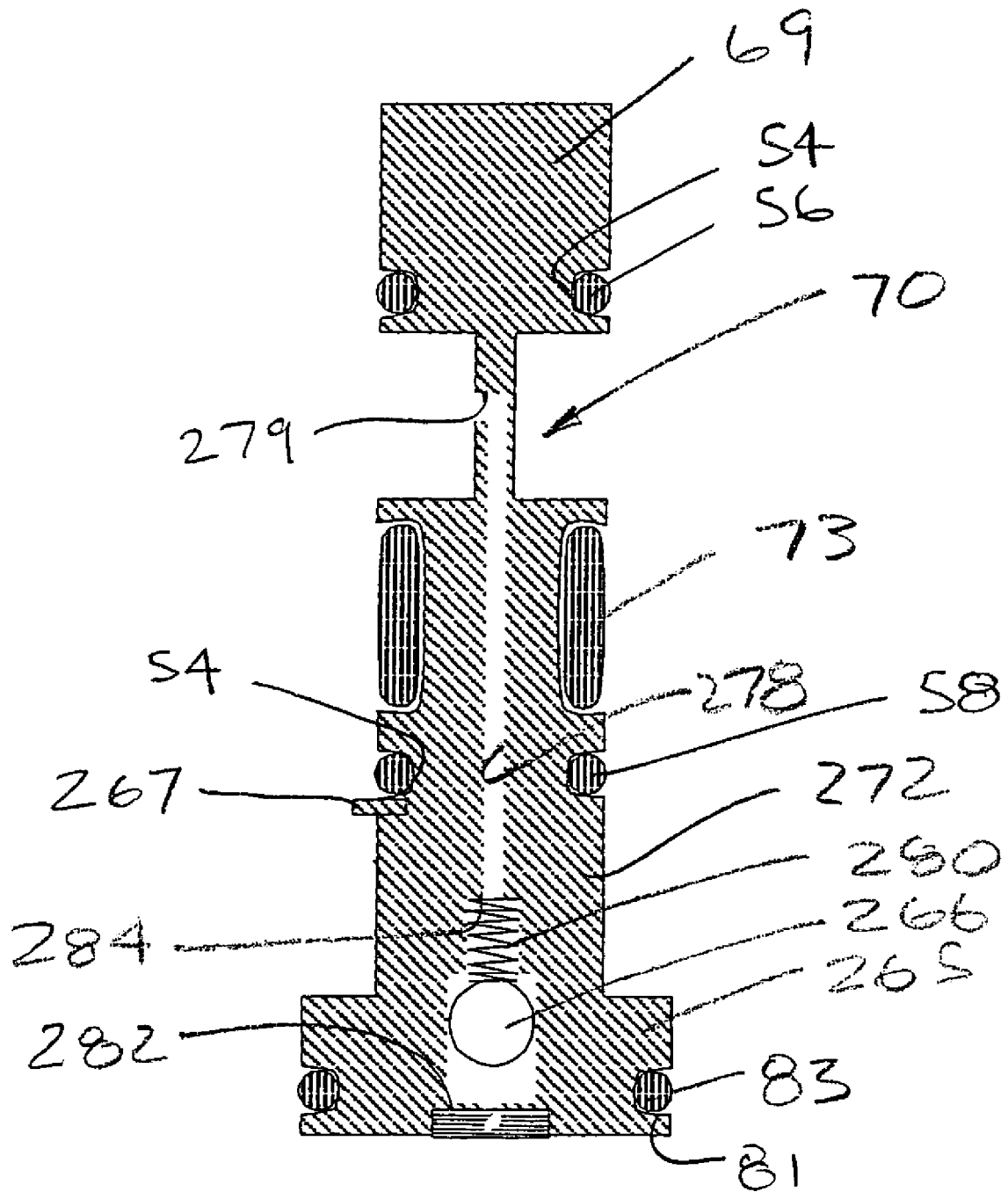
FIG. 4 is a partial cross-sectional view of the valve of the rupture control system of FIG. 3 showing the air pressure relief in greater detail.

The relief valve, in the embodiment disclosed in FIGS. 3-5, is a check-ball assembly including relief passage 278 extending through valve member 272, valve element, or ball, 266, first seat 282, spring 280 for biasing valve element 266 against first seat 282, and second seat 284. In ordinary operating conditions, element 266 may be positioned against the shoulder of first seat 282 by spring 280. Expanded air within valve control chamber 64 can lift element 266 from first seat 282 and then flow through relief passage 278. The air can then flow through exit 279 into the fluid flowing through valve passageway 70 and inner hose 32. Notably, exit 279 may be ported or oriented such that it does not open in a direction against the flow of fluid; rather, it may be oriented such that it opens in the downstream direction. Exit 279 may be oriented in this direction to take advantage of the low-pressure area immediately downstream of valve member 272. The low-pressure area is created due to the disturbed and interrupted flow of fluid around valve member 272. This low-pressure area allows the air to more easily escape from passage 278 and, in addition, it reduces the amount of fluid that will enter relief passage 278. Notably, in some embodiments, valve member 272 may be cylindrical and may rotate within valve housing 66. The rotation of valve member 272 may alter the alignment of exit 279, possibly reorienting it in the upstream direction. To prohibit large rotations of valve member 272, and accordingly, exit 279, valve member 272 may include projection 267 which may be sized and configured to travel within keyway 268 in valve housing 66. The interaction of projection 267 and keyway 268 may prevent valve member 272 from substantially rotating with respect to valve housing 66 yet permit valve member 272 to move linearly with respect to valve housing 66 between its open and closed positions as described above.

As a result of the above, the relief valve can release air pressure build-ups in valve control chamber 64 and prevent valve member 272 from being moved from its open position, as illustrated in FIG. 3, into its closed position prematurely. In the event that inner hose 32 ruptures and the pressurized fluid flowing therethrough enters into valve control chamber 64, the highly pressurized fluid will force relief element 266 against second seat 284, thereby closing relief passage 278. As a result, the fluid in valve control chamber 64 will not escape through relief passage 278 and the fluid will instead apply a force to valve member 72 to move it into its closed position as described in detail above. In lieu of venting the pressurized air into the fluid flow in inner hose 32, as described above, the air can be vented into the atmosphere. More particularly, referring to FIG. 3, rupture control system 220 may include vent 39 in outer hose 34. Vent 39 may comprise, similar to the above, a relief element, a spring, and first and second element seats. Vent 39, in the illustrated embodiment, functions in substantially the same way as the above-described relief valve in valve member 272. However, vent 39 may be constructed in any suitable manner to relieve undesired pressure build-up within containment passageway 35 and/or valve control chamber 64. For example, vent 37 may include porous media which permits the flow of gas therethrough, but prevents fluid from escaping from containment passageway 35.

Figure 9:
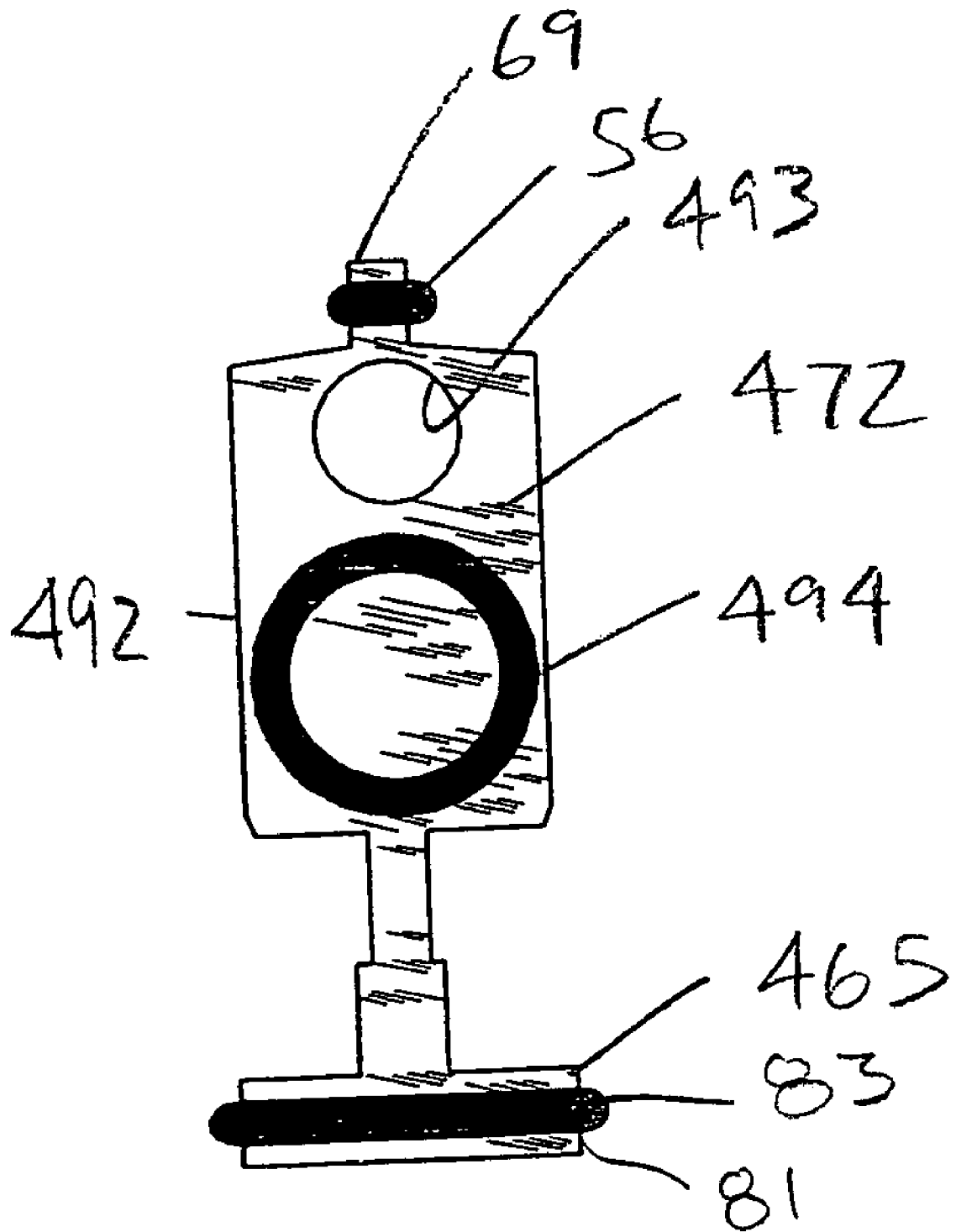
FIG. 9 is a side view of the gate valve member of the rupture control system of FIG. 8.
Figure 10:
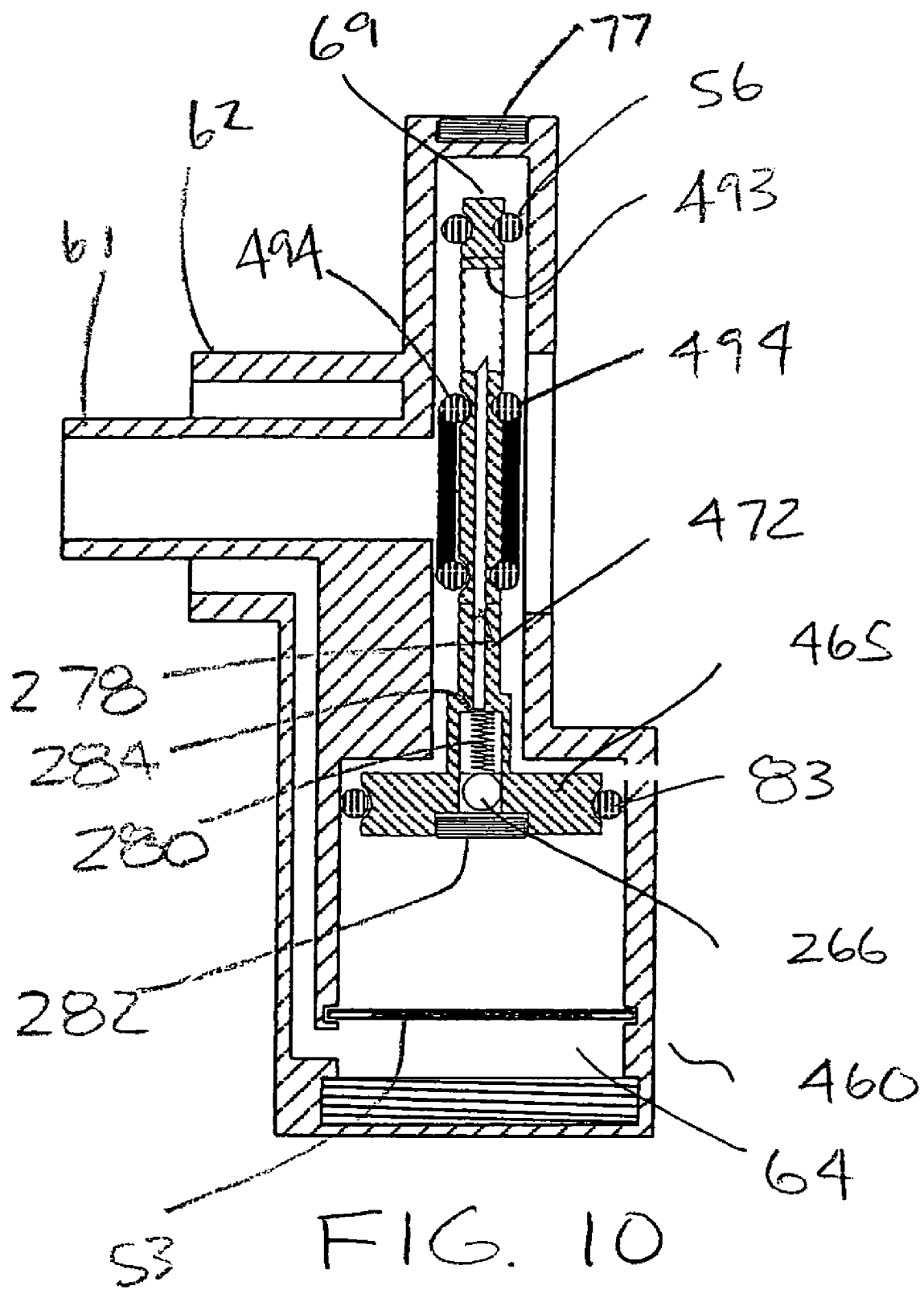
FIG. 10 is a cross-sectional, side view of the gate valve of FIG. 9.
Figure 11:
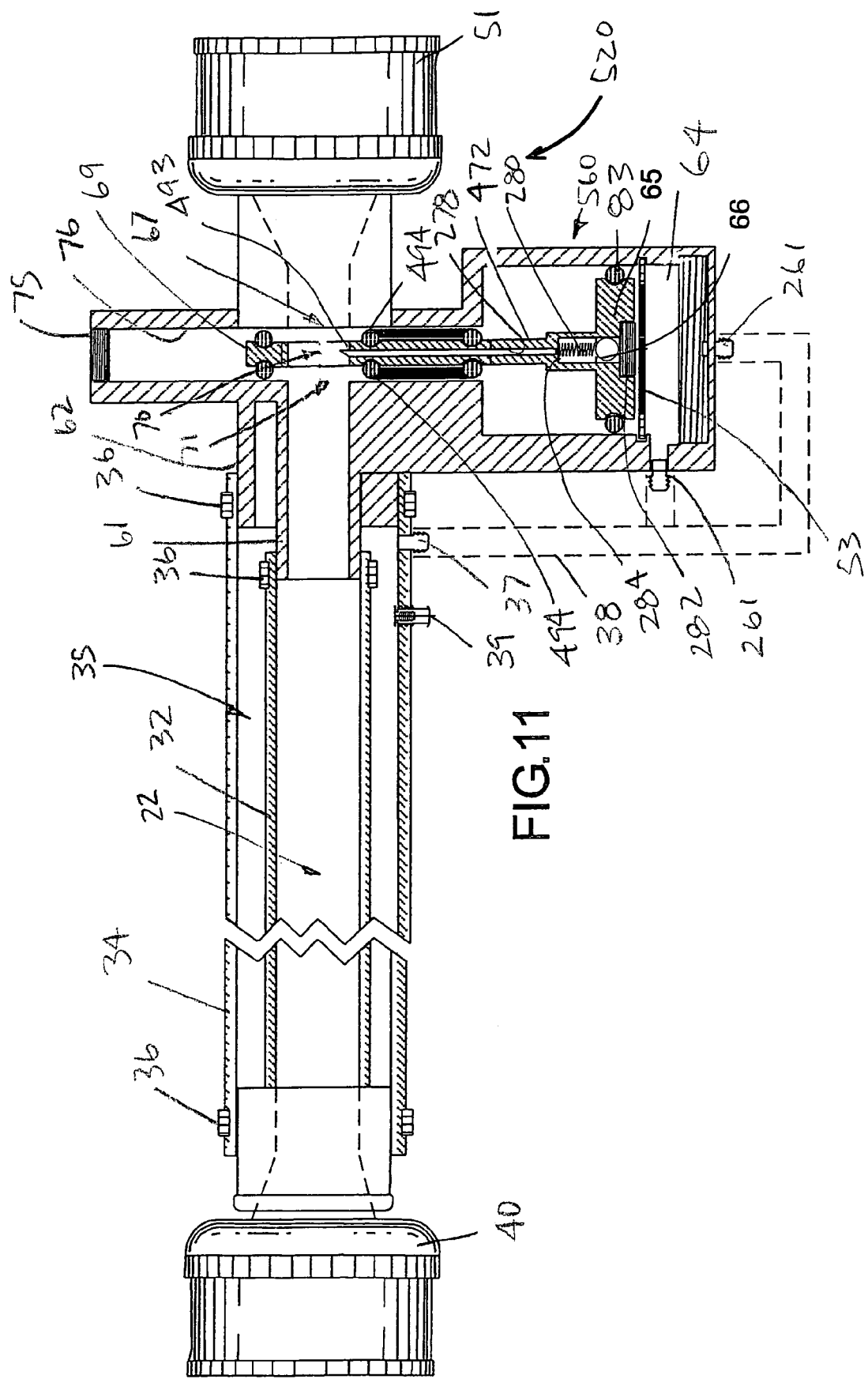
FIG. 11 is a cross-sectional, side view of a rupture control system in accordance with an alternative embodiment of the present invention having an externally ported gate valve illustrated in an open position.
Figure 12:
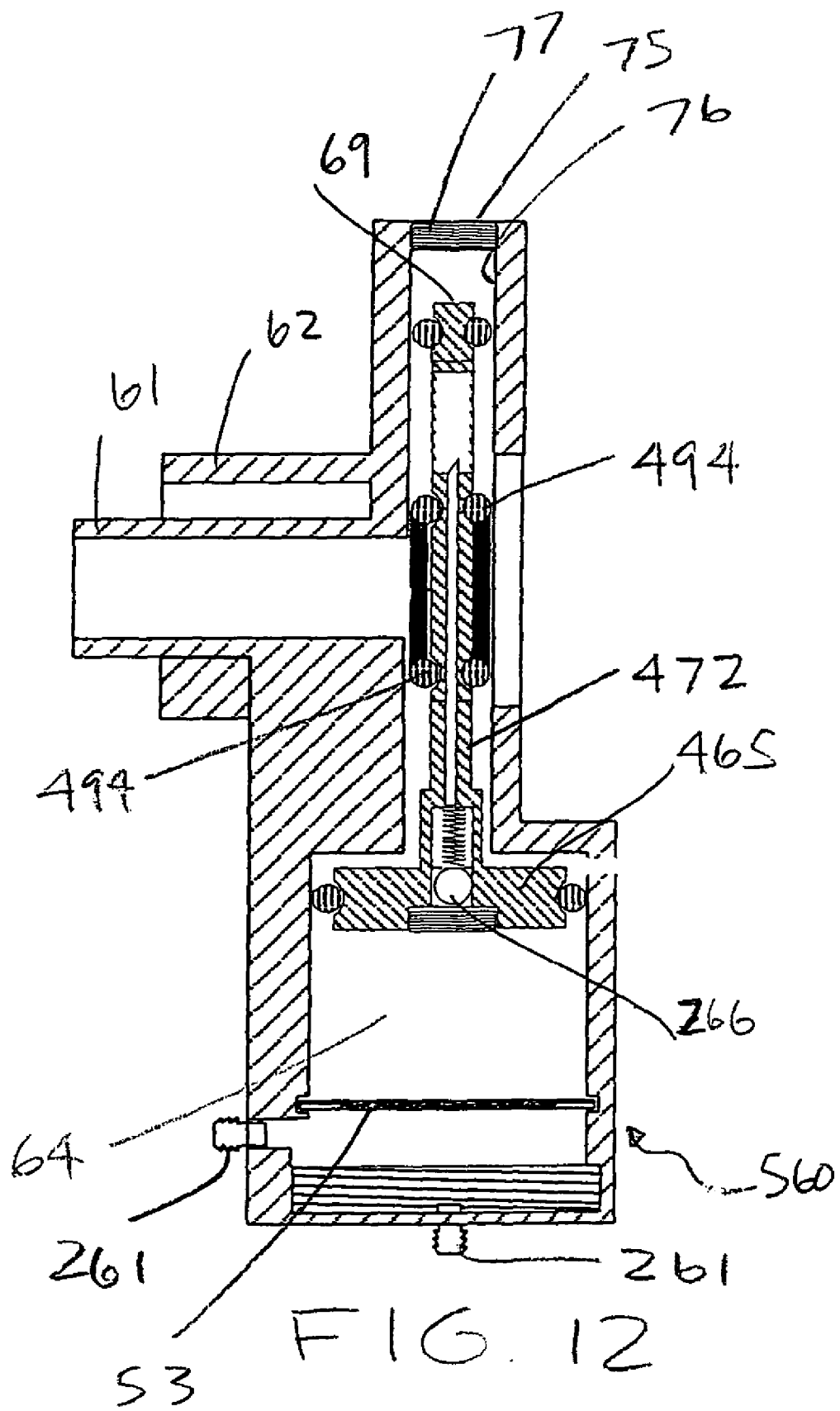
FIG. 12 is a partial cross-sectional view of the gate valve of FIG. 11 illustrated in a closed position.

Referring to FIGS. 8-10, rupture control system 420 may include gate valve 460 in lieu of valve 60. Gate valve 460 may operate in substantially the same manner as valve 60, however, valve member 472 of gate valve 460 may be differently configured that valve member 72 of valve 60. Referring to FIGS. 9 and 10, valve member 72 may include piston member 465, which is similar to piston 65 of valve member 72, and plate 492 which may include aperture 493 therein and annular seals 494 attached thereto on opposite sides thereof. Piston member 465 includes annular recess 81 which is configured for receiving annular seal 83. When fluid enters into valve control chamber 64 of valve 460, annular seal 83 may prevent fluid from substantially flowing between gate valve member 472 and the valve housing. When valve member 472 is in its open position, aperture 493 may place inlet 67 and outlet 71 in fluid communication. When valve member 472 is moved into its closed position, annular seal 494 may sealing engage the valve housing of valve 460 to prevent fluid from substantially flowing thereby. Referring to FIGS. 11 and 12, rupture control system 520, an alternative embodiment of the present invention, may include the gate valve illustrated in FIGS. 10-12 and the external porting system illustrated in FIG. 3.

The inner hoses 32 of the above-described embodiments may convey pressurized fluids where ruptures in the inner hoses 32 allow the pressurized fluids to escape therefrom. However, the present invention, in various embodiments, is also useful for controlling ruptures in vacuum hoses. For example, valve 60 of rupture control system 20 can be configured to respond to ruptures in inner hose 32 where the draw of the vacuum actuates valve 60. More particularly, valve 60 can be arranged such that when the vacuum is in fluid communication with passageway 35, valve member 72 is moved from its open position to its closed position. As a result, the vacuum draw in inner hose 32 is blocked by valve member 72 until the rupture can be repaired. This can be accomplished by reversing the valve porting in valve 60 such that conduit 38, for example, is in fluid communication with a valve control chamber on the opposite side of valve member 72.

Referring to FIG. 1, the embodiments described above may include inner hose 32, outer hose 34, valve 60, and two fittings, e.g., fittings 40 and 51, which are configured to be readily connected to common device and plumbing connections. Various embodiments are envisioned where the above described components are provided, unassembled or partially assembled, in a retro-fit kit. In at least one embodiment, a serviceman could disconnect an existing hose, for example, and cut the hose to a desired length. To complete the assembly, the serviceman could connect valve 60 onto one end of the existing hose, place outer hose 34 over the existing hose, and attach the hoses to fitting 40 via clamps 36 as described above. The finished assembly would function in an equivalent manner to a factory made rupture control system 20; however, implementing such a retro-fit process allows the components to be customized to a particular application.

It is an object of the present invention to provide an improved rupture control system for containing and controlling fluids, gasses, substances, vapors, and/or vacuums, escaping from a ruptured or failed hose, conduit, or vessel, that is relatively easy to install, is compact, and is of greater attributable effect than existing hoses, conduits, and valve systems by utilizing the leaked fluids to close a supply source valve without the requirement of external interaction or input.

Various embodiments of the rupture control system can be implemented with very little, or even no, plumbing skills which lends the invention to do-it-yourself installation. Further, the above-described systems can be implemented in applications where no power sources or other external activators are available. Since the above-described devices do not require any electronic circuitry, solenoids or motors to function, they provide a cost-effective and reliable means of containing leaked fluids and turning off the source of fluid leakage.

It should be understood that, in alternative embodiments, the components, devices, apparatus, and elements thereof may be somewhat different than those depicted and described above. This invention is susceptible to considerable variation in its practice and is intended for a wide variety of applications ranging from household clothes and dish washers, faucets, commodes, and the like, to aerospace, marine and land transportation vehicles and systems. In addition, vacuum systems in scientific, industrial, and commercial applications may equally enjoy the advantages of the rupture containment and control systems provided by this invention. Therefore, any and all information disclosed herein is not intended to limit, and should not be construed as limiting the invention to the particular exemplifications presented herein.

What is claimed is:

1. A rupture control system for a conduit system for conducting fluid from a fluid source to a fluid receiver, the rupture control system comprising:

a valve in fluid flow relationship with an inner conduit wherein the inner conduit is configured to be pressurizable by the fluid from the fluid source;

wherein the inner conduit has an outer surface, an inlet in selective fluid communication with the fluid from the fluid source through the valve, and an outlet in fluid communication with the fluid receiver;

an outer conduit configured pressurizable by the fluid from the fluid source, the outer conduit having an inner surface, a first end and a second end, the outer conduit sized and configured to receive an annular and longitudinal fluid conducting portion of the inner conduit therein;

wherein the inlet of the inner conduit and first end of the outer conduit are attached sealably to the valve;

wherein a containment/control passageway pressurizable by the fluid from the fluid source is defined between the outer surface of the inner conduit and the inner surface of the outer conduit, forming a fluid tight seal about the portion of the inner conduit received in the outer conduit;

wherein the valve is attached between the fluid source and the inner conduit inlet and has a valve control comprising a biasing mechanism for moving the valve from an initial first position to a second position in response to a pressure in the containment/control passageway greater than a preset level;

wherein the valve is configured to allow fluid communication between the fluid source and the inner conduit in the first initial position and to prevent fluid communication between the fluid source and the inner conduit in the second position;

wherein the valve control comprises a valve control chamber in fluid communication with the containment/control passageway, a valve member unaffixed to the valve housing and received inside a bore of the valve housing, the bore being configured to allow linear movement of the valve member in a direction transverse to the direction of fluid flow from the fluid source to the inner conduit;

wherein the valve member has an elongated portion linearly reciprocating in the bore and attached to a first side of an enlarged head portion, the enlarged head portion having a second side exposed to the valve control chamber and is supported by a valve stop in the first initial position;

wherein the inner conduit outlet and the outer conduit second end are attached sealably to a connector, the connector comprising a means for allowing fluid communication between the inner conduit and the fluid receiver, the connector sized and configured to maintain ability of the inner conduit, the outer conduit, and the containment/control passageway to withstand fluid pressure of the fluid from the fluid source;

wherein, upon rupture, at least some of the fluid from the fluid source flowing in the inner conduit flows through the rupture into the containment/control passageway and the valve control, whereby pressure of the fluid from the fluid source causes a response by the valve control to move the valve to the second position.

2. The rupture control system of claim 1, wherein the outer conduit is an outer hose.

3. The rupture control system of claim 1, wherein the containment/control passageway is in fluid communication with the inner conduit only upon rupture of the inner conduit.

4. The rupture control system of claim 1, wherein the valve further comprises at least one retaining mechanism for physically locking the valve in the first position and/or the second position.

5. The rupture control system of claim 1, further comprising a control valve placed in the containment/control passageway to prevent the fluid from the fluid source from urging the valve from the first position to the second position or from the second position to the first position.

6. The rupture control system of claim 1, wherein the valve further comprises an indicating and/or a reset mechanism for returning the valve to the first position, wherein movement of the valve to the second position reveals a visual change of the valve position/condition through an aperture in the valve, the aperture allowing for mechanically returning the valve to the first position, wherein the valve stop prevents the valve member during the return of the valve toward the first position, from impinging, covering, and/or blocking at least a portion of at the inner conduit and/or the containment/control passageway.

7. The rupture control system of claim 1, further comprising a device operatively engaged with the valve, the device including at least one of an audio and a visual feedback device, the valve activating the device when the valve is moved into the second position.

8. The rupture control system of claim 1, further comprising a relief valve in fluid communication with the containment/control passageway and with the valve control, whereby air in the containment/control passageway and/or the valve control may escape therefrom via the relief valve.

9. A rupture control system for a conduit system for conducting fluid from a fluid source to a fluid receiver, the rupture control system comprising:
- a valve in fluid flow relationship with an inner conduit wherein the inner conduit is configured to be pressurizable by the fluid from the fluid source;
- wherein the inner conduit has an outer surface, an inlet in selective fluid communication with the fluid from the fluid source through the valve, and an outlet in fluid communication with the fluid receiver;
- an outer conduit configured pressurizable by the fluid from the fluid source, the outer conduit having an inner surface, a first end and a second end, the outer conduit sized and configured to receive an annular and longitudinal fluid conducting portion of the inner conduit therein;
- wherein the inlet of the inner conduit and first end of the outer conduit are attached sealably to the valve;
- wherein a containment/control passageway pressurizable by the fluid from the fluid source is defined between the outer surface of the inner conduit and the inner surface of the outer conduit, forming a fluid tight seal about the portion of the inner conduit received in the outer conduit;
- wherein the valve is attached between the fluid source and the inner conduit inlet and has a valve control comprising a biasing mechanism for moving the valve from an initial first position to a second position in response to a pressure in the containment/control passageway greater than a preset level;
- wherein the valve is configured to allow fluid communication between the fluid source and the inner conduit in the first initial position through a valve passage and to prevent fluid communication between the fluid source and the inner conduit in the second position;
- wherein the valve control comprises a valve control chamber in fluid communication with the containment/control passageway, a valve member unaffixed to the valve housing and received inside a bore of the valve housing, the bore being configured to allow linear movement of the valve member in a direction parallel to an axial direction of the valve passage;
- wherein the valve member is in the form of a piston sleeve, the piston sleeve having an elongated portion linearly reciprocating in the bore and attached to a first side of an enlarged head portion, the enlarged head portion having a second side exposed to the valve control chamber;
- wherein the piston sleeve comprises an annular recess, the annular recess being configured to allow fluid flow in the valve passage in the first initial position and block the flow of fluid in the valve passage in the second position;
- wherein the inner conduit outlet and the outer conduit second end are attached sealably to a connector, the connector comprising a means for allowing fluid communication between the inner conduit and the fluid receiver, the connector sized and configured to maintain ability of the inner conduit, the outer conduit, and the containment/control passageway to withstand fluid pressure of the fluid from the fluid source;
- wherein, upon rupture, at least some of the fluid from the fluid source flowing in the inner conduit flows through the rupture into the containment/control passageway and the valve control, whereby pressure of the fluid from the fluid source causes a response by the valve control to move the valve to the second position.

10. The rupture control system of claim 9, wherein the outer conduit is an outer hose.

11. The rupture control system of claim 9, wherein the containment/control passageway is in fluid communication with the inner conduit only upon rupture of the inner conduit.

12. The rupture control system of claim 9, wherein the valve further comprises at least one retaining mechanism for physically locking the valve in the first position and/or the second position.

13. The rupture control system of claim 9, further comprising a control valve placed in the containment/control passageway to prevent the fluid from the fluid source from urging the valve from the first position to the second position or from the second position to the first position.

14. The rupture control system of claim 9, wherein the valve further comprises an indicating and/or a reset mechanism for returning the valve to the first position, wherein movement of the valve to the second position reveals a visual change of the valve position/condition through an aperture in the valve, the aperture allowing for mechanically returning the valve to the first position.

15. The rupture control system of claim 9, further comprising a device operatively engaged with the valve, the device including at least one of an audio and a visual feedback device, the valve activating the device when the valve is moved into the second position.

16. The rupture control system of claim 9, further comprising a relief valve in fluid communication with the containment/control passageway and with the valve control, whereby air in the containment/control passageway and/or the valve control may escape therefrom via the relief valve.

* * * * *